Aug. 20, 1940. F. A. WOOL 2,211,919
APPARATUS FOR DICING FRUIT
Filed Oct. 24, 1936 3 Sheets-Sheet 2
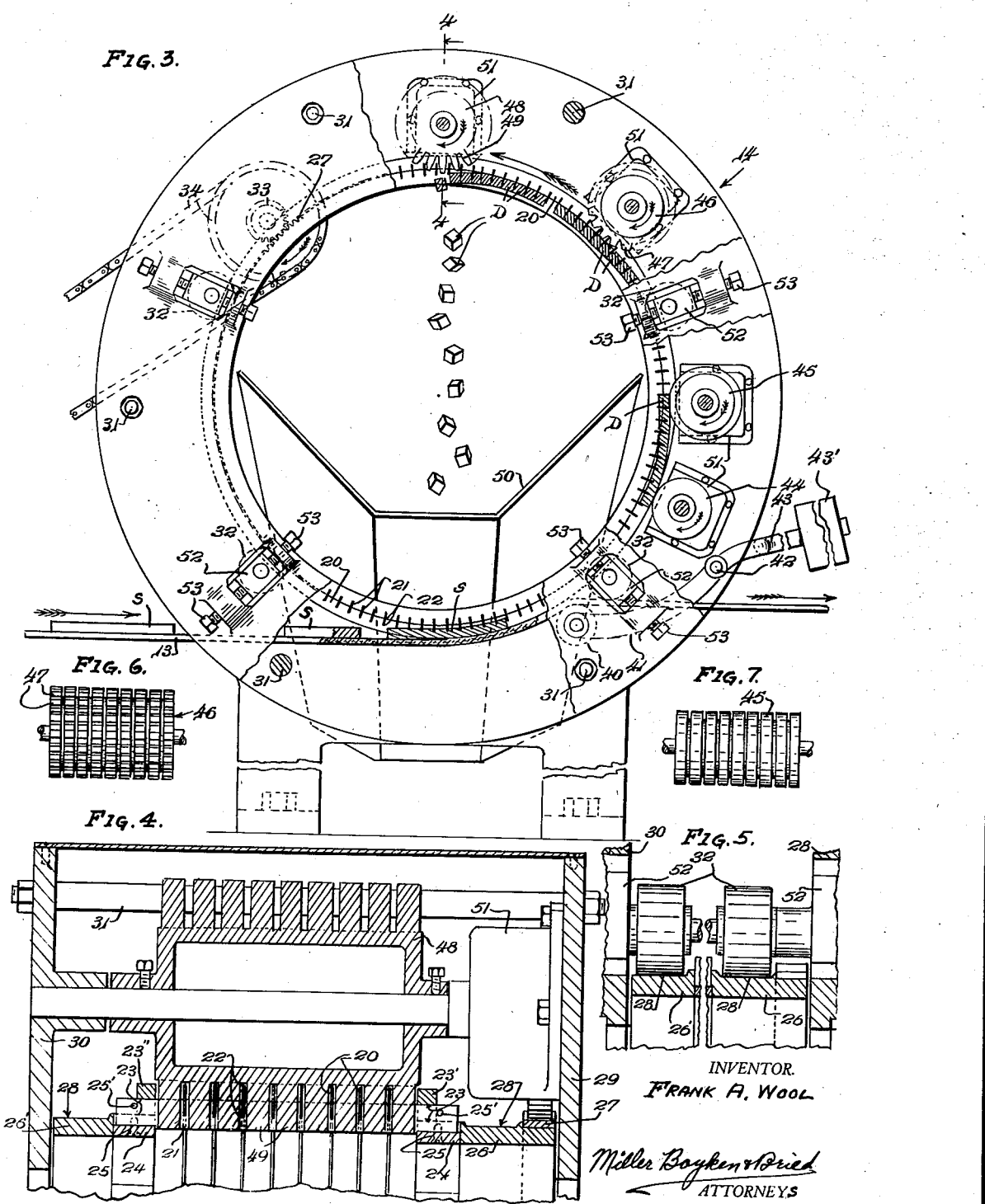
INVENTOR.
FRANK A. WOOL
Miller Boyken & Fried
ATTORNEYS Aug. 20, 1940.  F. A. WOOL  2,211,919
APPARATUS FOR DICING FRUIT
Filed Oct. 24, 1936  3 Sheets-Sheet 3
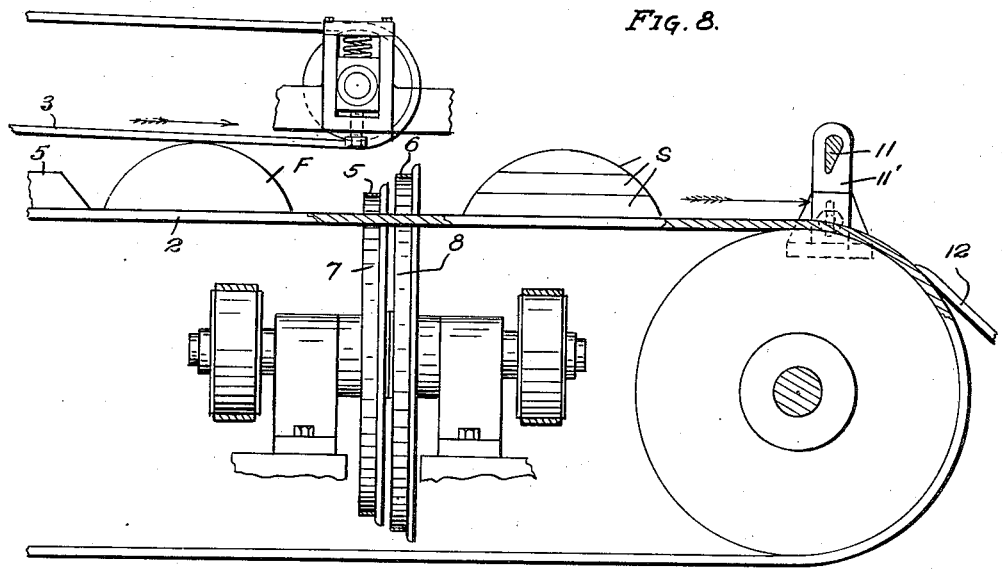
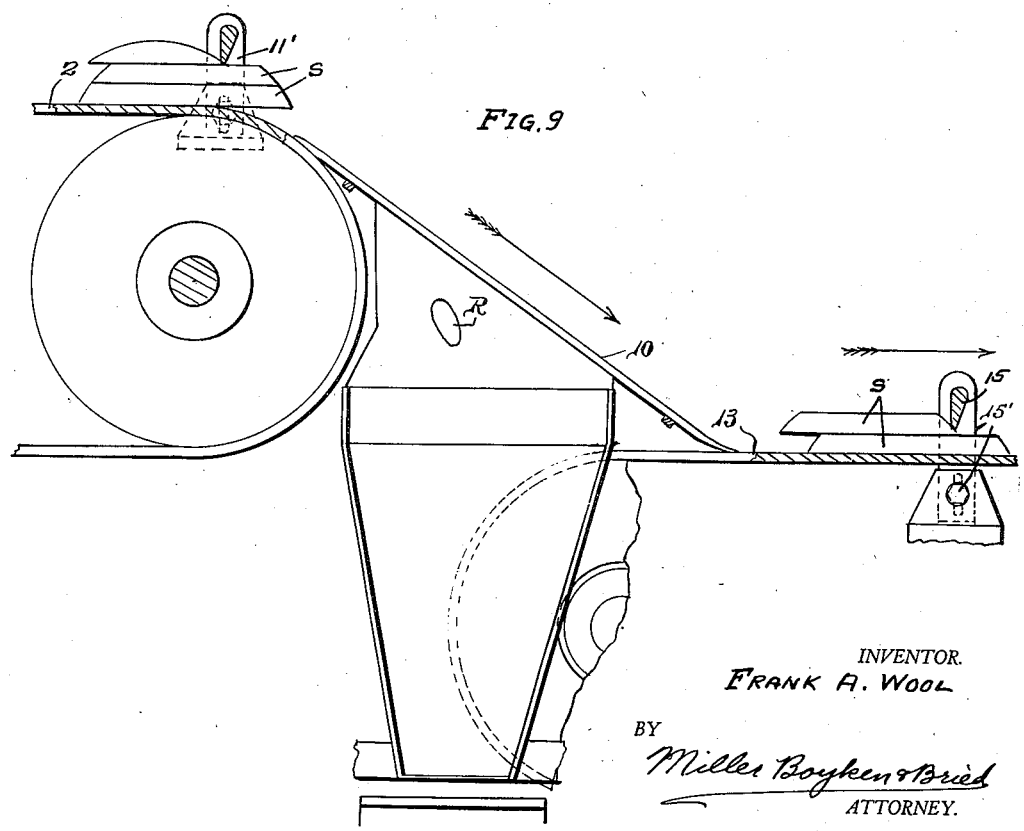
INVENTOR.
FRANK A. WOOL
BY Miller Boyken & Bried
ATTORNEY.

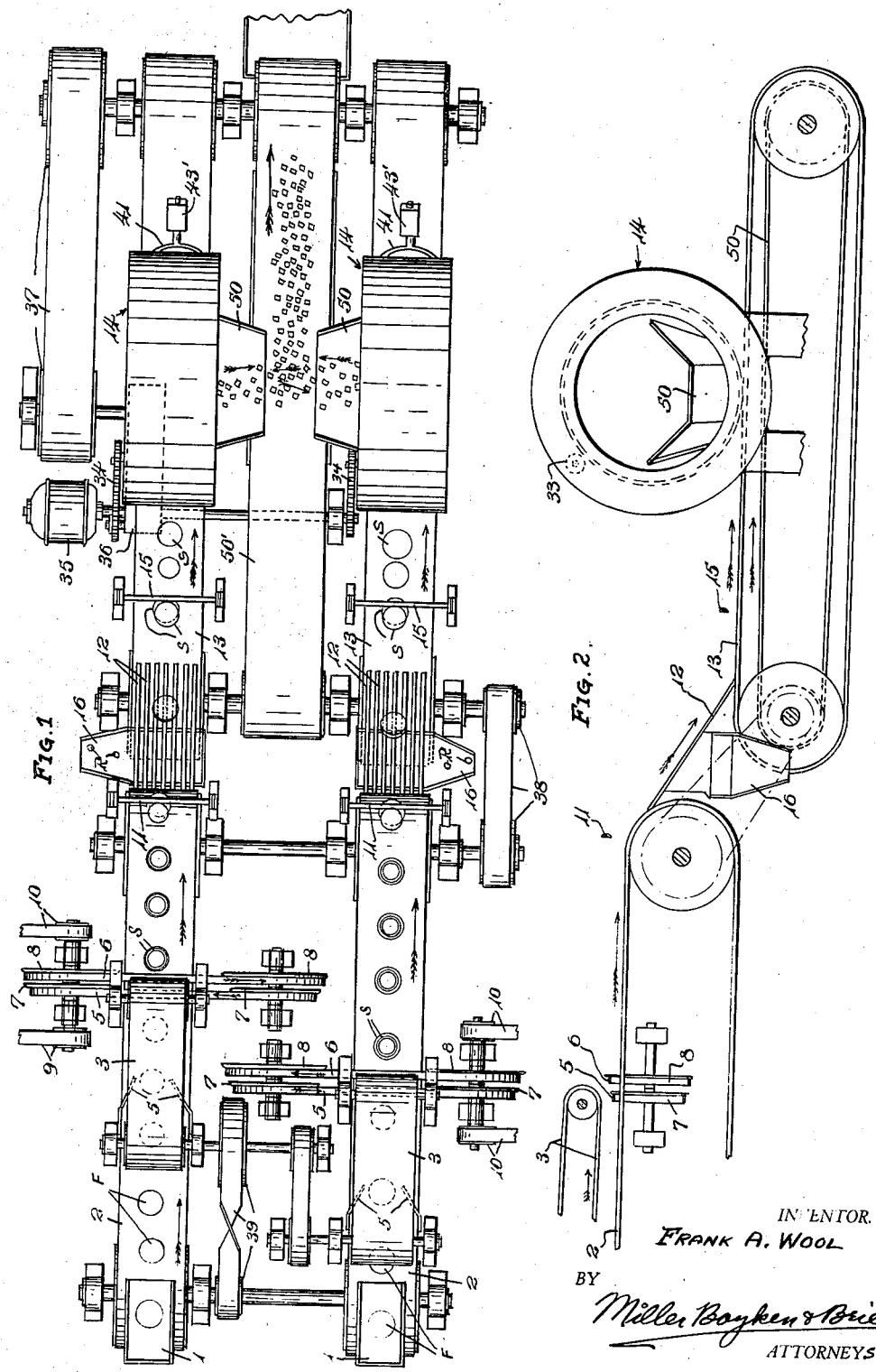

Patented Aug. 20, 1940

2,211,919

UNITED STATES PATENT OFFICE 2,211,919

APPARATUS FOR DICING FRUIT

Frank A. Wool, San Jose, Calif.

Application October 24, 1936, Serial No. 107,442

16 Claims. (Cl. 146—78)

This invention relates to apparatus and method for dicing fruit, and has for its objects the provision of apparatus for rapidly, economically, and accurately cutting fruit units into uniformly sized small pieces, such as small cubes. In the canning industry, fruits of various kinds, such as apples, peaches, pears, are cut into small cubes, mixed together, and canned. Heretofore great difficulty has been experienced in reducing the fruit to cubes of uniform size and having clean cut corners, and performing this step with sufficient rapidity to make the canning of this type of fruit attractive to the canner. These difficulties are entirely overcome by my apparatus and method. Other objects and advantages of my invention will appear in the description and drawings annexed hereto.

In the drawings,

Fig. 1 represents a plan view of a pair of fruit-cutting and dicing machines arranged to enable an automatic mixing of several kinds of diced fruit, where desired.

Fig. 2 is a diagrammatic side view of a portion of one of the dicing machines, showing the bare general idea, without refinements, shown elsewhere, in order to more clearly show the method and principle of the invention.

Fig. 3 is an enlarged side view of the dicing portion of the apparatus, with certain parts broken away and in section for more clearly showing the operation of the elements.

Fig. 4 is an enlarged sectional view of a portion of the device illustrated in Fig. 3 as seen along the line 4—4 of Fig. 3, showing one of the rollers of the dicing machine, the roller shaft and housing containing the conventional reduction gearing being shown in elevation.

Fig. 5 is a fragmentary sectional view (enlarged) showing, in elevation, one set of supporting rollers that are a part of the dicing machine.

Fig. 6 is a reduced elevational view of one of the fruit-engaging rollers in the dicing machine.

Fig. 7 is a reduced elevational view of another one of the fruit-engaging rollers of the fruit-dicing machine.

Fig. 8 is an enlarged side view, partly in section, of a portion of the apparatus for initially reducing units of fruit; such as halves, to dices of uniform thickness.

Fig. 9 is an enlarged side view, partly in section, showing a portion of the apparatus adapted to separate the superposed cut slices of fruit to a layer of single thickness.

Referring to Figs. 1 and 2, each of the machines comprises a feed hopper or chute, adapted to deliver fruit halves, F such as peaches, onto a belt conveyor 2, an operator or fruit turning device (not shown) is positioned to insure the halves being turned with the flat cut side against the belt 2.

The fruit halves are carried on belt 2 to below a hold-down endless belt 3 that moves at the same speed as belt 2, and which belt 3 is slightly inclined longitudinally so as to permit the fruit to freely pass to the space between belts 2 and 3 before the top of the fruit engages belt 3. Converging guide strips 5 positioned over belt 3 function to insure the fruit halves being positioned on belt 2 in substantially single file, the guide strips being positioned adjacent the end of belt 3 at which the fruit passes to between belts 2, 3 so as to shift any misaligned fruit halves before belt 3 engages the halves.

As the fruit halves are carried along belt 2 toward the opposite, exit end, of belt conveyor 3, and just before the halves are released from engagement with belt 3, they are successively sliced into two or more slices S along planes parallel to the cut side of the halves by a pair of rapidly moving band saws 5, 6, that are respectively mounted for movement on pairs of flanged pulleys 7, 8 which pairs of pulleys are adapted to be rotated oppositely as by separate pulleys and belts 9, 10. The upper runs of the bands 5, 6 are respectively off-set horizontally, but relativly close together, and extend transversely across belt 3 and across the path of travel of the fruit halves. The upper run of band 5 extends in a horizontal plane parallel with the plane of belt 2 and is spaced above belt 2 a distance substantially that of the desired thickness of the ultimately formed cubes or "dices" of fruit respectively. The upper run of band 6 is likewise in a horizontal plane parallel with the plane of belt 2 and is spaced above belt 2 a distance substantially double that of the desired thickness of the ultimately formed cubes or "dices" of fruit respectively. Band 5 is offset horizontally toward the oncoming fruit units, and engages the units just prior to the release of the units from engagement with the hold-down belt. If there are any pits or hard foreign substances in the fruit, immediately upon engagement of such pit or foreign substance, the teeth of the band saw 5 will quickly jerk the fruit half laterally off the belt 2, but if the halves are free of pits or hard material, the halves will be cut into several slices S of uniform thickness by the saws without being shifted on the belt, and the fact that the band saws are running in opposite directions and are in engagement with the fruit halves at the same time, insures against the halves being moved laterally on the belt 2 should some of the halves be fairly hard and firm relative to others.

Normally the slices S remain one on top of the other after leaving the saws and I provide a vertically adjustable cross bar 11 beyond the saws and extending transversely across the belt 2 at the end of the belt opposite the feed chute 1, which cross bar is parallel with the plane of the belt and spaced thereabove a distance to engage the uppermost slice of the cut fruit, but allowing the lower slices to freely pass therebeneath. The upper slice accordingly slides off the lower slices and onto the belt 2 and the upper and lower slices are carried below bar 11 onto a downwardly inclined stationary grill-like chute 12 on which the slices slide quickly away from belt 2 and onto a second, endless flat conveyor belt 13 adapted to move more rapidly than belt 2 and arranged to carry the slices away from belt 2 to a dicer, generally designated 14.

Before the fruit reaches the dicer, the slices pass under a second vertically adjustable cross-bar 15 positioned over the upper run of belt 13 in the same manner as bar 11, except that bar 15 is spaced a distance above belt 13 to engage the slice of fruit carried on the lowermost slice thereby sliding the upper slice onto the belt 13. Thus the slices of fruit on belt 13 are reduced to a single layer of slices before entering the dicer, and the slices are prevented from piling up at the cross bars due to the fact that the belt 13 moves at a speed to insure spacing of the fruit on belt 13 while the under pieces of fruit at bar 11 quickly slide out from under the upper slice and down the grill 12 preventing piling up at bar 11.

The grill 12 consists of horizontally spaced bars that extend longitudinally of the path of travel of the fruit, the bars being spaced a distance to permit any small pieces R (Fig. 9) of a size unsuitable for dicing to fall between the bars and onto a chute 16 so as to be removed from the path of travel of the main slices.

From bar 15 onward, the ultimate operation of dicing the slices is performed, although prior operations co-act in the apparatus toward the ultimate end of dicing the fruit.

The dicer, generally designated 14, (Figs. 3 to 7) comprises a horizontal row of horizontally aligned equally spaced annular, relatively thin cutting knives 20, having their peripheral edges sharpened, the outside diameter of said annular knives, preferably being approximately 18 inches and the adjacent knives being spaced apart approximately a distance the thickness of the fruit slices S, which distance is normally about one half inch and the knives themselves are approximately one half inch in width. In the drawings, I show eight of the annular knives, which knives are mounted intermediate their ends on straight cross knives 21.

The cross knives 21 are arranged in planes extending radially of the axes of the annular knives and at right angles to the annular knives and project outwardly at their opposite ends of the opposite end knives of the row of annular knives 20. The knives 21 are approximately the same width as the knives 20 and are sharpened on their outwardly facing edges. Each of the knives 21 is slotted at 22 from the cutting edge inwardly for approximately half the width of the knives, which slots 22 are of a width to slidably, but closely, receive the inner marginal edges of the annular knives 20, thus spacing the knives 20 and positioning the cutting edges of the knives 21 radially inwardly of the cutting edges of knives 20 a distance approximately half the thickness of the cut slices S, and half the width of the knives 20 respectively.

The cross knives 21 are spaced from each other approximately the thickness of the cut slices S, which is the same as the spacing between the annular knives 20, thus the knives 21 form an annular row of knives completely around the knives 20.

The knives 21 are supported in spaced relation and in planes extending radially of the axes of the annular knives 20, at their opposite ends in radially inwardly opening slots 23 cut in annular rings 23', 23" positioned outwardly of the end knives of the row of annular knives 20. The knives 21 are held in the slots against the closed ends of said slots by annular rings 24 which rings 24 are supported in place by screws 25 that threadedly engage the rings 23' 23" between the slots 23. Preferably, rings 24 are made up in segments, thus permitting ease of removal and substitution of any of the cross-knives 21 without disassembling the entire assembly. Outward of rings 23', 23", the ends of cross-knives 21 are provided with openings for stop pins 25' which also engage the outer sides respectively of rings 23', 23", thereby functioning to prevent any longitudinal shifting of the cross-knives.

Rings 23', 23" respectively are each formed with a horizontally projecting annular flange 26, 26' extending outwardly from the inner edges of the rings 23', 23" and in directions outwardly of the ends of the row of annular knives. The flange 26 is provided at its outer edge with a ring gear 27 and the peripheral surface of both of the flanges is machined at 28 for providing a nice cylindrical rolling surface.

The knives and their supporting assemblage, as described above, are revolvably supported between two opposed end frames or end plates 29, 30 that are connected in spaced relationships by tie bars 31 thus forming a single supporting frame. Rotatably mounted on the plates 29, 30 and projecting inwardly from the adjacent inner sides of the plates are four spaced pairs of rollers 32 (Figs. 3, 5) that are positioned to rotatably engage the outer sides of flange 26, 26' for revolvably mounting the knife assembly and a drive pinion 33 rotatably supported on plate 29 engages the ring gear 27 for driving the knife assembly through means of a chain and sprocket 34 connected with a driving motor 35 through conventional reduction gears (not shown) in a gear box 36 (Fig. 1). The plates 29, 30, straddle the belt 13 and the peripheral edges of the annular knives engage said belt, the belt and knife assembly being synchronized through the gear reduction drive in box 36 for continuously moving at the same rate of speed to eliminate any slippage between the belt and knives, belt 13 being driven through the pulley and belt connection 37 with the reduction gearing in box 36 and belts 2, 3 are connected respectively by belt and pulley connections 38, 39 through the drive 37 for being simultaneously driven at proper speeds, as described, by the motor 35 (Fig. 1). Thus when the motor 35 is actuated the entire system is actuated with all parts synchronized as to their speeds.

At the dicer 14 the belt 13 is yieldably held in engagement with the annular knives over part of the arc described by the knives, by a roller 40 engaging below the upper rim of belt 13, which roller is rotatably mounted between the arms of a fork 41 which fork is pivotally connected to plates 29, 30 by a pivot 42, and an arm 43 on the opposite side of fork 41 from the pivot carries a weight 43' adjustable along arm 43 for yieldably urging the roller 40 upwardly to hold the belt against the knives, as described. Thus the belt is free to yield downwardly should any material injurious to the knives be accidentally carried on belt 13 to the knives.

In operation, the fruit slices S are carried on belt 13 to the knives 20, 21 (Fig. 3) and are cut by the annular knives 20 into elongated strips and at the same time the knives 21 partially enter the fruit, thus the fruit is firmly supported by the knives for carrying around the dicer, the curve of belt 13 at its point of engagement with the knives insuring the slices S being curved to conform to the arc of the annular knives before the slices are carried by the knives away from the belt.

After the fruit is carried by the knives clear of the belt, it is engaged by a plain roller 44 that is rotatably supported between plates 29, 30, and which roller is of rubber or other suitable material that will not injure the knives which roller functions similar to belt 13 in insuring the slices that have been cut by the annular knives against any tendency to leave the knives.

Just beyond plain roller 44 is a grooved roller 45 (Figs. 3, 7) mounted similar to roller 44, the grooves in the roller 45 receiving the outer edges of the annular blades 20 and the portions of the roller between the grooves substantially engaging the outer edges of the cross knives 21, thus acting to force the slices cut by the annular knives inwardly for progressively further cutting by the cross-knives into dices D.

Spaced beyond the roller 45 is a fingered roller 46 (Figs. 3, 6) grooved similar to the roller 45 and similarly mounted on the plates 29, 30, the fingers 47 of roller 46 fitting in the squares formed by the cross-knives and annular knives to further progressively move the dices D radially inwardly a distance to just clear the inner edges of the annular knives, thus leaving the dices supported wholly by the cross-knives.

At the top of the knife assembly and spaced beyond roller 46 is a second fingered roller 48 (Figs. 3, 4) the fingers 49 of said roller being longer than the fingers 47 of roller 46 which fingers 49 mesh in the squares formed by the annular knives and cross-knives, and force the dices D clear of the cross-knives, thus ejecting the dices for falling onto inclined chute 50 for sliding onto conveyor belt 50' for removal to any desired point for further treatment or canning.

Each of the rollers 44, 45, 46, 48 is of similar material and is mounted on plate 30 at one of their ends for rotation and their opposite ends respectively are mounted in conventional gear reduction boxes 51 for driving by conventional reduction gearing in said boxes from the ring gear 27, as best seen in Fig. 4, the reduction gearing in each box being arrayed to drive the rollers at the same surface speed as the cutting knives to thus insure against injury to the cutting knives and to insure a proper meshing of the fingers of rollers 46, 48 in the squares formed by the annular and cross-knives.

In Fig. 3, it will be seen that the knife assembly can be accurately adjusted bodily by reason of the sliding blocks 52 that mount the shafts of rollers 32, said blocks being adjustably supported between adjusting bolts 53.

Where it is desired to dice and mix the diced fruit, two or more of the systems, as described are connected for operation as shown in Fig. 1, in which the chutes 50 at the dicers 14 discharge toward each other onto belt 50', the diced fruit being thoroughly mixed on the belt 50' and the different fruits may readily be proportioned as desired merely by regulating the relative speed of the two machines through any suitable speed regulation, the drawings illustrating a system in which equal amounts of different fruits are cut and mixed.

It is also to be noted that only one cross bar, as at 15, need be used to insure a single layer of slices S on the belt leading to the dicer, which bar 15, is vertically adjustable as by bolts and slotted mounting brackets 15' and bar 11 is similarly mounted in brackets 11'.

It is, of course, obvious that where an operator is employed to space the fruit halves prior to cutting by the saws, the belt 2 and grill 12 may be eliminated and belt 13 extended to take the place of belt 3. In such modification, the operator, of course, also removes any small pieces of foreign material from the belt instead of relying upon the grill 12.

Referring again to the dicing operation, that is performed by the knives 20, 21, it will be seen that at no time are the dices of fruit engaged between the knives over their full outer lateral surfaces, but instead, as soon as the strips of fruit cut by the annular knives are partially cut by the cross-knives, they are progressively relieved from the friction of the annular knives and thus the cubes or dices are readily ejected by the fingers 49 on roller 48. The off-setting of the cutting edges of the annular and cross-knives and their relation in width to the width of the sides of the dices becomes very important in insuring perfectly square cubes with sharply defined edges, which cubes are easily ejected from the knife assembly without injury thereto.

Since the knives are continuously revolved to continuously and progressively dice the fruit that is fed in a constantly moving file thereto, the efficiency of the machine, as to its capacity to dice fruit is extremely high, and I have found that my apparatus will dice several times the amount of fruit per hour of any other machine or apparatus of which I am aware.

Having described my invention, I claim:

1. Apparatus of the character described, means for supporting units of fruit for continuous movement along a path of travel, cutting means at a point along and over said path of travel arranged and adapted to substantially simultaneously cut said units along lines at right angles to each other into cubes and to remove said fruit units upwardly from said path of travel, said cutting means comprising a plurality of spaced, annular blades arranged in co-axial alignment and a circular row of spaced elongated, straight blades extending transversely across the annular blades, said circular blades being formed with outer peripheral cutting edges and the straight blades respectively being formed with a cutting edge along one of their longitudinally extending edges, the cutting edges of the straight blades facing radially outwardly of the axis of the annular blades and spaced from the cutting edges of the annular blades in a direction radially inwardly of the axis of the annular blades.

2. A fruit dicing device comprising a row of relatively thin flat, similar-sized annular knives uniformly spaced apart and arranged in co-axial alignment with their adjacent flat sides in opposed relationship and formed with their peripheral outer edges sharpened to provide cutting edges, a circular row of uniformly spaced relatively thin, elongated, flat, cross-knives positioned around the circumference of the annular knives and extending thereacross longitudinally of the row of annular knives and with their adjacent flat sides in approved relationship, the edges of the cross-knives positioned radially outwardly of the axis of the annular knives being sharpened to form cutting edges and the peripheral cutting edges of the annular knives being disposed outwardly beyond the cutting edges of the cross knives, the spaces between the cross-knives being substantially equal to the spaces between the annular knives, means mounting the annular knives and cross-knives for revolving about the axis of the annular knives, means for conveying fruit units to the cutting edges of the annular knives and cross-knives for cutting by the annular and cross-knives and means for revolving the annular and cross-knives.

3. In a construction as defined in claim 2, the means for supporting the annular and cross-knives including a cylindrical member positioned at each opposite end of the row of annular knives having a radially outwardly facing cylindrical bearing surface of substantially the diameter of the annular knives and rollers rotatably engaging the bearing surfaces of the cylindrical members at spaced points thereabout.

4. In a construction as defined in claim 2, said cross-knives supporting the annular knives against the inner edges of the latter and segments of a ring positioned at each of the opposite ends of the row of annular knives supporting the cross-knives in engagement against the inner edges of the annular knives, means removably mounting the segments in knife supporting position.

5. In a construction as defined in claim 2, said cross-knives extending at their opposite ends outwardly of the opposite ends of the row of annular knives and the cross-knives supporting the annular knives against the inner edges of the latter, the cross-knives being slotted from their cutting edges toward their opposite edges for receiving the inner edges of the annular knives, and an annular ring positioned at each of the opposite ends of the row of annular knives supporting the cross-knives in spaced relation and in position in engagement with the inner edges of the annular knives.

6. In a construction as defined in claim 2, means positioned at spaced points around the peripheral edges of the annular knives arranged and adapted to progressively force the fruit units radially inwardly of the annular knives and past the annular and cross-knives for ejection of the pieces cut by the annular and cross-knives in a direction radially inwardly of the annular knives and means for simultaneously moving said saws respectively in opposite directions.

7. In combination, conveyor means for supporting fruit halves for movement in one general direction only along a path of travel, means at a point along said path of travel arranged and adapted to substantially simultaneously cut the fruit halves respectively into superposed slices of substantially uniform thickness, means positioned at a point along said path of travel arranged and adapted to distribute the cut slices in a single layer on said conveyor means, means positioned at a point along said path of travel after the slices are distributed in a single layer arranged and adapted to substantially simultaneously cut the slices into cubes of substantially uniform size and to carry the fruit away from said conveyor means in a circular path of travel, and means for ejecting the cut cubes from said circular path of travel.

8. In the combination as defined in claim 7, the means for cutting the fruit halves into slices being arranged and adapted to eject fruit halves containing pits from said path of travel.

9. In apparatus for cutting disk-like slices of fruit into cubes, a cutting device comprising a row of axially aligned, spaced, annular knives having sharpened outer peripheral edges and an annular row of spaced, flat-sided, elongated cross-knives disposed crosswise of the annular knives with their sides in planes extending radially of the central axis of the annular knives, the outer edges of the cross-knives being sharpened and disposed radially inwardly of the cutting edges of the annular knives a distance substantially that of the thickness of the slices to be cut into cubes, means for revolving the annular and cross-knives together around the central axis of the annular knives, means for supporting and for conveying slices of fruit to a point adjacent a side of the cutting device for initial engagement and cutting by the annular and cross-knives, a plurality of rollers at spaced points around the outer peripheral edges of the annular knives beyond the point of initial engagement of the fruit by the knives in the direction of movement of the annular and cross-knives, the successive rollers beyond the point of initial engagement of the fruit by the knives being formed on their outer sides with projections of increasing length adapted to enter the spaces between the annular knives and cross-knives for progressively forcing the slices engaged by the annular and cross-knives radially inwardly of the annular knives for progressive cutting of the slices by the knives into cubes and for forcing the cubes past the knives, and means for revolving the rollers in synchronism with the rate of movement of the annular and cross-knives.

10. In a machine for cutting flat slices of fruit into uniform cubes, a generally cylindrical cutter supported for rotation about its cylindrical axis, said cutter comprising a plurality of circular cutters secured for rotation in planes at right angles to such axis, the peripheral edges of said circular cutters forming cutting edges lying in common cylindrical alignment and said cylindrical cutters further comprising a series of straight blades having their cutting edges spaced radially inwardly of the peripheral limits of said circular cutter edges and secured for cutting action in a plane at right angles to the circular cutter surface.

11. In apparatus of the character described; conveyor means including a flat, endless belt for carrying a row of flat disc-like slices of fruit thereon in a row along a generally horizontally extending path of travel, cutting means positioned over said belt arranged and adapted to successively engage the slices of the row and to remove the units from said belt, and to carry the units upwardly therefrom in a single circular path of travel, said means being also arranged and adapted to coact therewith for, initially, partially cutting said slices in the direction of their movement, and then, substantially simultaneously cutting the slices respectively into a plurality of cube shaped pieces, during movement on said circular path, and means for ejecting the cube shaped pieces from said circular path inwardly toward the cylindrical axis thereof.

12. In combination with a device as defined in claim 7, a second device of substantially the same character, means for directing diced fruit ejected from both devices to a common delivery point, and means for transporting the cubes from the respective devices from said delivery point in uniformly mixed condition to a packing point in the ratio determined by the production rates of said respective devices.

13. In combination with a device as defined in claim 7, a second device of substantially the same character, means for directing cubes ejected from both devices to a common delivery point, means for transporting cubes from the respective devices from said delivery point to a packing line in the mixed state determined by the production rates of said respective devices, and means for driving said devices in a fixed production ratio.

14. In apparatus for cutting disk-like slices of fruit into cubes, a cutting device comprising a horizontal row of axially aligned, spaced, annular knives and an annular row of straight cross-knives arranged crosswise of the annular knives around the circumferential length of the annular knives, the cutting edges of said annular and cross-knives being directed radially outwardly of the central axis of said row of annular knives, means for revolving the annular and cross-knives about said axis as a unit, a horizontal, horizontally extending conveyor belt for the slices of fruit extending below said cutting device in a direction transversely of said axis, and generally in the direction of movement of the lowermost portions of the annular knives, means supporting the belt substantially against the outer edges of said annular knives from the lowermost point of said annular knives to a second point beyond said lowermost point in the direction of movement of said belt and at a level above said lowermost point for causing fruit conducted to said lowermost point to be carried in engagement with said annular knives upwardly to said second point, means for moving said belt in a direction to carry the fruit to said lowermost point, said means including a pulley supporting the belt at said second point, and means releasably supporting said pulley in position for urging the belt toward the cutting device at said second point for swinging of the pulley in direction away from said cutting device upon predetermined pressure against the belt caused by a predetermined resistance of the knives to cutting material on said belt, and means adjacent said second point and thereabove arranged and adapted to engage fruit carried by the annular and cross knives past said point.

15. In combination, conveyor means arranged and adapted for supporting fruit halves having substantially flat faces on one of their sides for continuous movement in one general direction along a path of travel with their flat faces in substantially the same plane, means at a point along said path arranged and adapted to cut said halves into generally disk-like slabs of uniform thickness in planes disposed parallel with the planes of said flat faces, means positioned at a point along said path of travel arranged and adapted to substantially simultaneously cut said disk-like slabs into cubes of substantially uniform size and to carry the slabs during cutting thereof into cubes away from said conveyor means in a circular path of travel, and means for ejecting the cubes from said circular path of travel.

16. In a machine for cutting fruit into cubes, a generally cylindrical cutter supported for rotation about its cylindrical axis, said cutter comprising a plurality of annular cutters secured for rotation in planes at right angles to such axis, the peripheral edges of said annular cutters forming cutting edges lying in common cylindrical alignment and said cylindrical cutter further comprising an annular row of straight blades concentric with said axis, the blades of said row being uniformly spaced apart and extending crosswise of the annular cutters and having radially outwardly directed cutting edges relative to said axis lying substantially within the peripheral limits of the cutting edges of the annular cutters, said annular cutters being uniformly spaced apart, means for rotating said cylindrical cutter and for conveying fruit to cutting edges of said annular cutters and said straight blades at a point around the cylindrical cutter for cutting by the cutting edges of the annular cutters and straight blade, means at spaced points around said cylindrical cutter in the direction of rotation thereof actuated by rotation of said cylindrical cutter arranged and adapted to progressively force the fruit engaged by the annular cutters and cross-blades radially inwardly of said axis for forcing the fruit past said annular cutters and cross-blades for discharge to within the cylindrical cutter, the means for conveying the fruit to the cylindrical cutter being arranged and adapted to deliver the fruit to the lower side of the cylindrical cutter and to support the fruit in engagement with the cutter during cutting thereby.

FRANK A. WOOL.